US012546205B2

(12) United States Patent
Toelke et al.

(10) Patent No.: US 12,546,205 B2
(45) Date of Patent: Feb. 10, 2026

(54) CLASSIFICATION OF PORE OR GRAIN TYPES IN FORMATION SAMPLES FROM A SUBTERRANEAN FORMATION

(71) Applicant: Halliburton Energy Services, Inc., Houston, TX (US)

(72) Inventors: Jonas Toelke, Houston, TX (US); Andre de Almeida Maximo, Rio de Janiero (BR); Jacob Michael Proctor, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 700 days.

(21) Appl. No.: 17/542,155

(22) Filed: Dec. 3, 2021

(65) Prior Publication Data

US 2023/0175384 A1 Jun. 8, 2023

(51) Int. Cl.
*E21B 47/002* (2012.01)
*E21B 47/02* (2006.01)
(Continued)

(52) U.S. Cl.
CPC .......... *E21B 47/0025* (2020.05); *E21B 49/02* (2013.01); *G06T 7/0004* (2013.01);
(Continued)

(58) Field of Classification Search
CPC ............. E21B 47/0025; E21B 2200/22; E21B 2200/20; E21B 49/02; E21B 49/00;
(Continued)

(56) References Cited

U.S. PATENT DOCUMENTS

2017/0286802 A1* 10/2017 Mezghani ............... E21B 49/02
2019/0087939 A1* 3/2019 Hakimuddin ............ G06T 7/11
(Continued)

FOREIGN PATENT DOCUMENTS

CN 117237303 A * 12/2023
CN 117868810 A * 4/2024
(Continued)

OTHER PUBLICATIONS

Vogel, H. J. "Morphological determination of pore connectivity as a function of pore size using serial sections." European Journal of Soil Science 48.3 (1997): 365-377.
(Continued)

*Primary Examiner* — Jeffrey P Aiello
(74) *Attorney, Agent, or Firm* — John Wustenberg; C. Tumey Law Group PLLC

(57) ABSTRACT

A method is provided for automatically classifying grains, pores, or both of a formation sample. The method includes receiving a digital image representation of the formation sample, and identifying a plurality of pores, grains, or both in the digital image representation. The method also includes computing a plurality of geometric features associated with the pores, grains, or both in the digital image representation, and inputting the geometric features into an unsupervised machine learning model. The unsupervised machine learning model determines a label for each identified pore and grain, the label being a pore-type or a grain-type, and the plurality of geometric features and the labels determined for each pore, grain, or both, are input into a supervised machine learning model. The supervised machine learning model determines a final classification of a pore-type for each pore and a grain-type for each grain in the digital image representation of the formation sample.

20 Claims, 7 Drawing Sheets

(51) Int. Cl.
*E21B 49/02* (2006.01)
*G06T 7/00* (2017.01)

(52) U.S. Cl.
CPC . *E21B 2200/22* (2020.05); *G06T 2207/20081* (2013.01); *G06T 2207/30181* (2013.01)

(58) Field of Classification Search
CPC ...... E21B 44/00; G01N 33/241; G01N 33/24; G01N 15/1433; G01N 15/1484; G01V 1/306; G01V 1/50; G01V 2210/624; G01V 2210/6244; G01V 2210/6248; G01V 3/18; G01V 3/32; G01V 3/38; G06N 20/00; G06N 3/045; G06N 3/084; G06N 3/08; G06N 3/088; G06N 3/02; G06T 2207/20081; G06T 2207/20084; G06T 2207/30181; G06T 7/0004; G06V 10/44; G06V 10/82; G06V 10/7784; G06V 10/764; G06V 10/7715; G06V 20/64; G06V 20/194
USPC ............ 73/1.85, 152.15; 382/286, 156, 159; 702/6, 188, 14, 2, 182, 22, 189, 11, 9, 13, 702/27, 1, 104, 127, 18, 153, 152; 703/10, 2; 706/12, 929
See application file for complete search history.

(56) References Cited

U.S. PATENT DOCUMENTS

2020/0005013 A1\* 1/2020 Zhao .................. G06T 7/11
2021/0090239 A1\* 3/2021 Pattnaik .............. G06T 7/174

FOREIGN PATENT DOCUMENTS

WO 2020-225592 11/2020
WO 2021-081559 4/2021

OTHER PUBLICATIONS

Vogel, H-J., and K. Roth. "Quantitative morphology and network representation of soil pore structure." Advances in water resources 24.3-4 (2001): 233-242.
Proctor, J., et al. "Traditional Carbonate Classification Documented Digitally in 3D with Micro CT Scanning." 71st EAGE Conference and Exhibition-Workshops and Fieldtrips. European Association of Geoscientists & Engineers, 2009.
International Search Report and Written Opinion for Application No. PCT/US2021/062345, dated Aug. 23, 2022.

\* cited by examiner

CLASSIFICATION OF PORE OR GRAIN TYPES IN FORMATION SAMPLES FROM A SUBTERRANEAN FORMATION

TECHNICAL FIELD

The present disclosure relates generally to evaluation of formation samples from a subterranean formation and, more particularly, to automatic classification of pore or grain types in formation samples from a subterranean formation.

BACKGROUND

Wellbores, such as those used in oil and gas extraction, are typically drilled into a geologic formation in a believed hydrocarbon bearing zone. However, the wellbore typically passes through several different formation types as it descends into the formation. Evaluation of the rock formations surrounding the wellbore allow for the most effective extraction locations to be selected. Typically, the formations surrounding the wellbore are evaluated using a petrophysical analysis of a formation sample to identify a specific rock type or the types of pores or grains in the rock. Such formation samples can be obtained during the drilling process or through the use of wireline tools. Specifically, the geologic formation sample can be scanned and displayed as an image and then sections of the geologic formation sample can be classified qualitatively by a geologist visually inspecting the image(s). The classification consists of labelling each pore or grain visible in the image with a certain type, where the type is defined in the geology literature and may contain sub-types or be aggregated in super-types, depending on the scale of the rock image. This process of a geologist manually labelling pore types and grain types is a laborious process that may be doable for thin sections, or single 2D images, but becomes extremely complicated for whole 3D volumes potentially consisting of hundreds of images. Furthermore, there are inconsistencies between the qualitative evaluation of pore types and grain types performed by individual geologists, meaning that two geologists looking at the same rock image may classify the pore types and/or grain types of the rock differently. This may call into question the accuracy of pore and grain type classifications, and the resulting determination of an expected production throughput of the formation from which the rock was extracted.

BRIEF DESCRIPTION OF THE DRAWINGS

Some specific exemplary aspects of the disclosure may be understood by referring, in part, to the following description and the accompanying drawings.

Figure 1A:
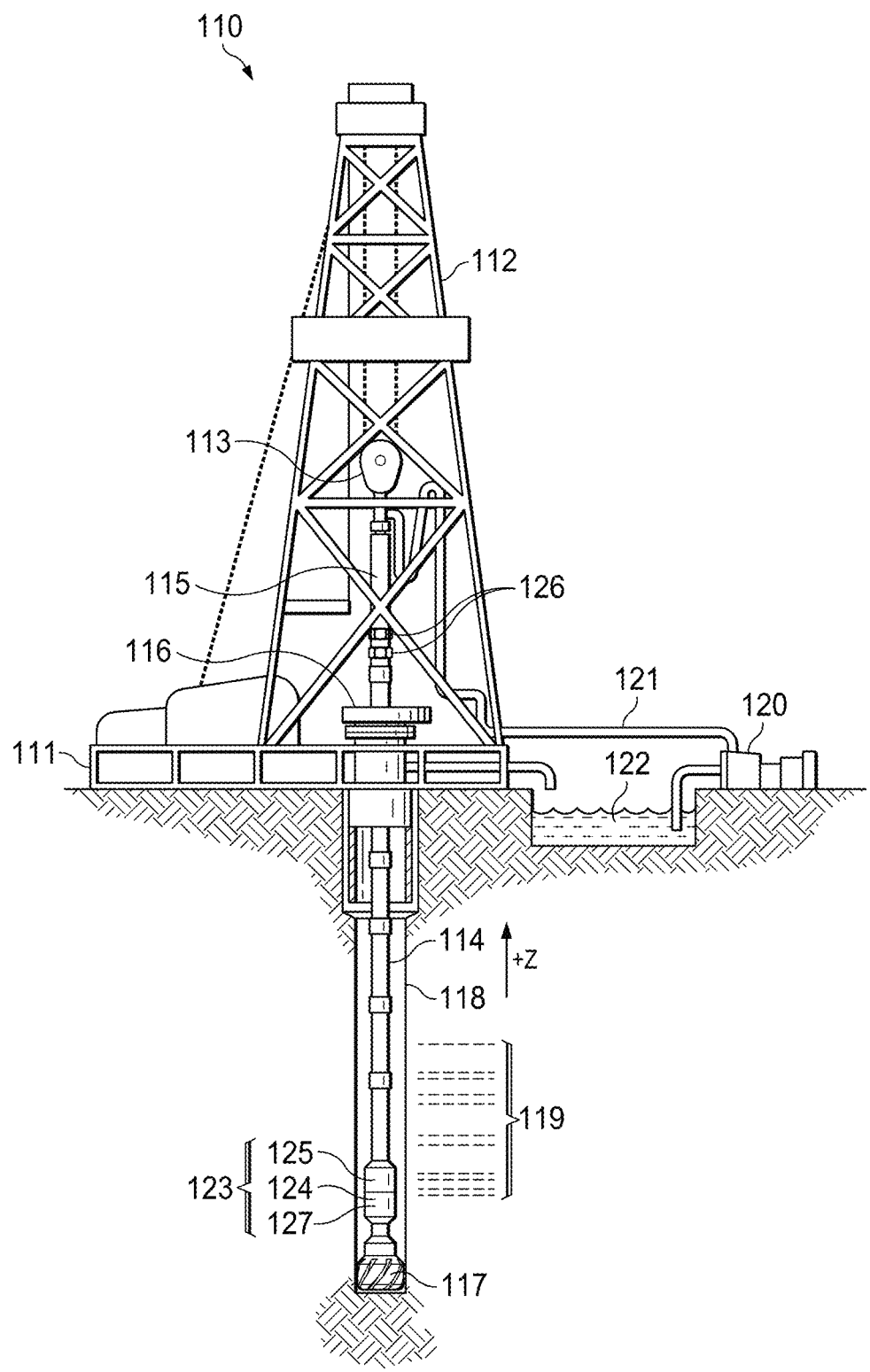
FIG. 1A is a schematic diagram of an exemplary drilling environment compatible with systems and methods in accordance with one or more aspects of the present disclosure.

While aspects of this disclosure have been depicted and described and are defined by reference to exemplary aspects of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described aspects of this disclosure are examples only, and not exhaustive of the scope of the disclosure.

DESCRIPTION OF CERTAIN EMBODIMENTS

The present application relates to a method, system, and non-transitory computer-readable medium to automatically classify pore or grain types on images of one or more formation samples taken from a subterranean formation. The images may be computer-tomograph (CT) images, or a 2D white light photograph, of scanned formation sample(s). The term "pore" in this context represent an empty space inside the rock sample, while the term "grain" represents a solid grain of the rock. Examples of pore types may include those listed in the Choquette & Pray (1970) pore type classification system, or whether a primary or secondary pore contains or lacks organic matter. Quantifying the potential to have organic matter deposited inside the pore helps in turn to define the oil and gas production potential throughput of the formation from which the rock was extracted.

The present disclosure relates to a software method, e.g., an algorithm, for 2D or 3D pore and/or grain type classification on a digital rock image scanned by a CT scanner or other imaging device at any scale. The method includes two techniques that are not apparently related to pores and rocks in images or volumes. The first technique is of a geometric nature and includes computing various geometric features of the pores and/or grains visible in the rock sample. The second technique involves training a machine-learning model to learn, based on all the geometric features computed by the first technique, how to classify the pore type for each pore and/or the grain type for each grain. The machine learning model may be a combination of unsupervised and supervised models, may include manual features or labels determined in previous images by one or more geologists, and may also include automatic features or labels computed by the first technique.

By the appropriate and orchestrated use of the geometric features, labels, and techniques described above, it is possible to classify pore types and/or grain types automatically, providing a high quality, accurate, consistent, and fast method for formation classification.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components. It may also include one or more interface units capable of transmitting one or more signals to a controller, actuator, or like device.

For the purposes of this disclosure, computer-readable media may include any instrumentality or aggregation of instrumentalities that may retain data and/or instructions for a period of time. Computer-readable media may include, for example, without limitation, storage media such as a direct access storage device (for example, a hard disk drive or floppy disk drive), a sequential access storage device (for example, a tape disk drive), compact disk, CD-ROM, DVD, RAM, ROM, electrically erasable programmable read-only memory (EEPROM), and/or flash memory; as well as communications media such as wires, optical fibers, microwaves, radio waves, and other electromagnetic and/or optical carriers; and/or any combination of the foregoing.

Illustrative aspects of the present disclosure are described in detail herein. In the interest of clarity, not all features of an actual implementation may be described in this specification. It will of course be appreciated that in the development of any such actual aspect, numerous implementation specific decisions are made to achieve the specific implementation goals, which will vary from one implementation to another. Moreover, it will be appreciated that such a development effort might be complex and time-consuming, but would, nevertheless, be a routine undertaking for those of ordinary skill in the art having the benefit of the present disclosure.

Figure 1B:
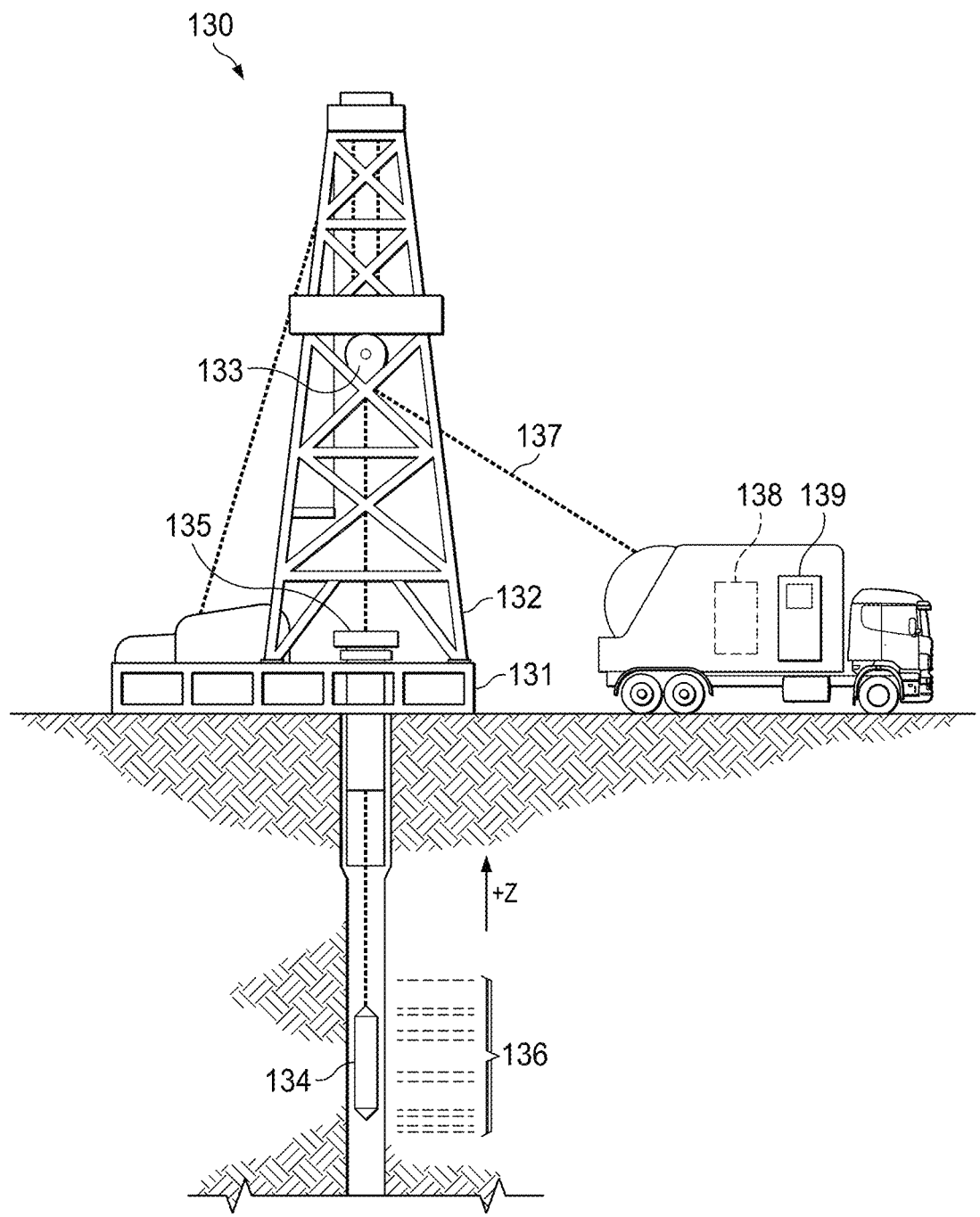
FIG. 1B is a schematic diagram of an exemplary conveyance wellbore environment compatible with systems and methods in accordance with one or more aspects of the present disclosure.
Figure 1C:
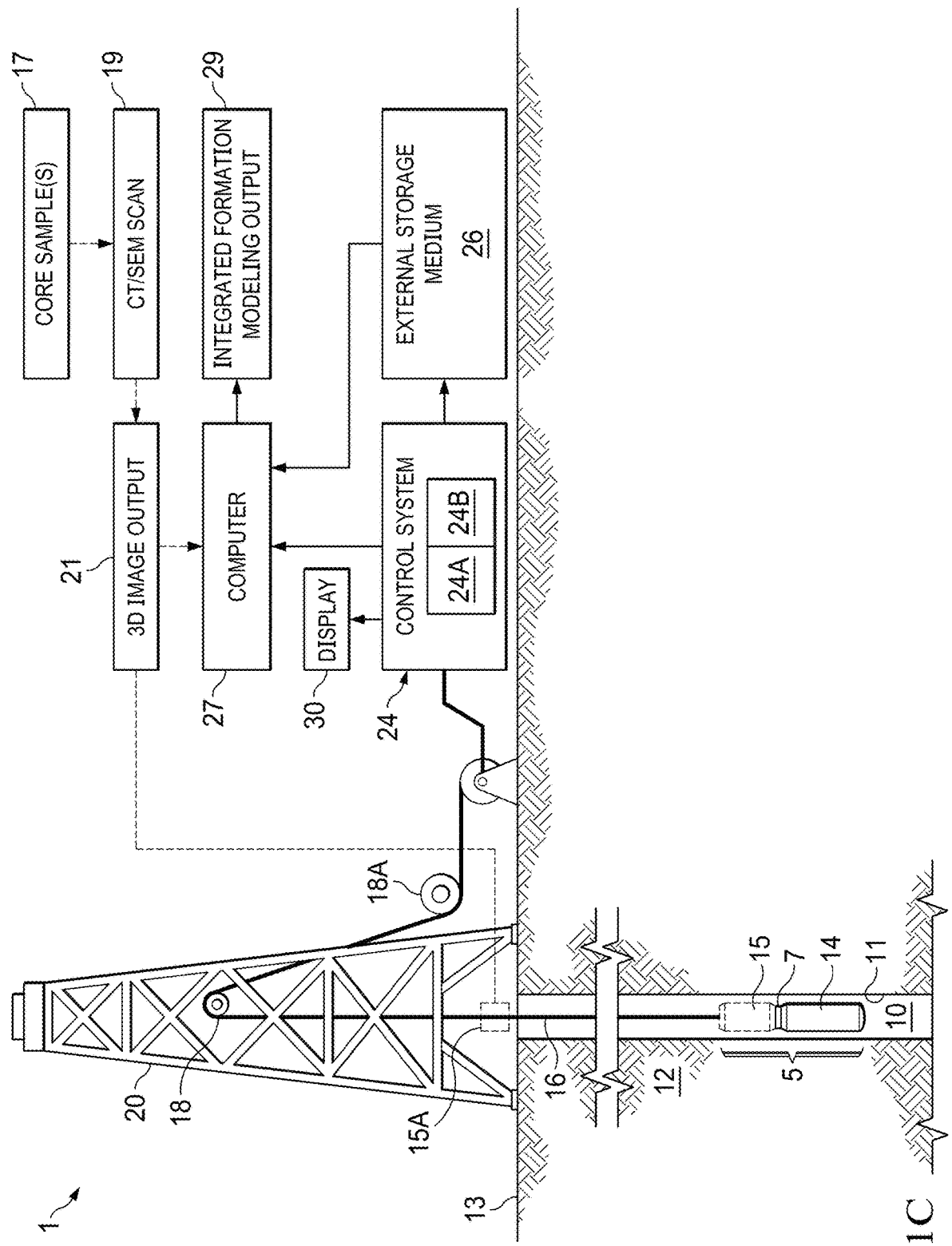
FIG. 1C is a schematic diagram of a system for formation sample retrieval and scanning analysis of a retrieved formation sample, in accordance with one or more aspects of the present disclosure.

Turning now to the drawings, FIGS. 1A, 1B, and 1C illustrate exemplary environments compatible with the disclosed systems and methods. For example, FIG. 1A illustrates a schematic view of an exemplary logging while drilling (LWD) and/or measurement while drilling (MWD) wellbore system 110 which can be used to create a wellbore and gather geologic formation samples for rock formation analysis. As depicted in FIG. 1A, a drilling platform 111 is equipped with a derrick 112 that supports a hoist 113 for raising and lowering a drill string 114. The hoist 113 may suspend a top drive 115 suitable for rotating the drill string 114 and lowering the drill string 114 through the well head 116. Connected to the lower end of the drill string 113 is a drill bit 117. As the drill bit 117 rotates, the drill bit 117 creates a wellbore 118 that passes through various formations 119. The drill string 114 can also include a sampling-while-drilling tool, operable to collect geologic formation samples of the various formations through which the drill passes for retrieval at the surface. In an alternative embodiment, analysis can be performed on drill cuttings retrieved at the surface of the wellbore. The wellbore 118 can be formed according to a desired well plan having one or more vertical, curved, and/or horizontal portions extending through one or more formations 119. A pump 120 circulates drilling fluid through a supply pipe 121 to top drive 115, down through the interior of chill string 114, through orifices in drill bit 117, back to the surface via the annulus around drill string 114, and into a retention pit 122. The drilling fluid transports cuttings from the wellbore 118 into the pit 122 and aids in maintaining the integrity of the wellbore 118. Various materials can be used for drilling fluid, including oil-based fluids and water-based fluids. As the cuttings from drilling are portions of the formation, they may be used as samples for scanning and imaging as disclosed herein.

As depicted in FIG. 1A, logging tools 124 are integrated into a bottom hole assembly 123 near the drill bit 117. As the drill bit 117 extends the wellbore 118 through the formations 119, logging tools 124 collect measurements relating to various formation properties as well as the orientation of the tool and various other drilling conditions. The bottom hole assembly 123 can include one or more logging tools 124. In at least one embodiment, one of the logging tools 124 of the bottom hole assembly 123 may include a measurement device as described herein. The logging tools 124 may be used for imaging or otherwise scanning, or measuring the formation 119 for producing the images as disclosed herein for use with geometric feature detection and machine learning processes. The bottom hole assembly 123 may also include a telemetry sub 125 to transfer measurement data to a surface receiver 126 and to receive commands from the surface. In some embodiments, the telemetry sub 125 communicates with a surface receiver 126 using mud pulse telemetry. In other cases, the telemetry sub 125 does not communicate with the surface, but rather stores logging data for later retrieval at the surface when the logging assembly is recovered. Notably, one or more of the bottom hole assembly 123, the logging tools 124, and the telemetry sub 125 may also operate using a non-conductive cable (e.g. slickline, etc.) with a local power supply, such as batteries and the like. When employing non-conductive cable, communication may be supported using, for example, wireless protocols (e.g. electromagnetic (EM), acoustic, etc.) and/or measurements and logging data may be stored in local memory for subsequent retrieval at the surface, as is appreciated by those in the art.

Each of the logging tools 124 may include a plurality of tool components, spaced apart from each other, and communicatively coupled with one or more wires. The telemetry sub 125 may include wireless telemetry or logging capabilities, or both, such as to transmit or later provide information indicative of received logging data to operators on the surface or for later access and data processing for the evaluation of fluid within the wellbore. The logging tools 124 may also include one or more computing devices 127 communicatively coupled with one or more of the plurality of tool components. The computing device 127 may be configured to control or monitor the performance of the tools 124, process logging data, and/or carry out the methods of the present disclosure.

In some embodiments, one or more of the logging tools 124 may communicate with a surface receiver 126, such as via a wired drillpipe. In other cases, the one or more of the logging tools 124 may communicate with a surface receiver 126 by wireless signal transmission. In at least some cases, one or more of the logging tools 124 may receive electrical power from a wire that extends to the surface, including wires extending through a wired drillpipe. In at least some instances, the methods and techniques of the present disclosure may be performed by a computing device (not shown) on the surface. In some embodiments, the computing device may be included in surface receiver 126. For example, surface receiver 126 of wellbore operating environment 110 at the surface may include one or more of wireless telemetry, processor circuitry, or memory facilities, such as to support substantially real-time processing of data received from one or more of the logging tools 124. In some embodiments, data is processed at some time subsequent to its collection, wherein the data may be stored on the surface at surface receiver 126, stored downhole in telemetry sub 125, or both, until it is retrieved for processing.

While FIG. 1A indicates that the wellbore is in the drilling stage, the methods and systems as described herein can be used at any point throughout the life of a wellbore. One example of such environment is shown in FIG. 1B.

FIG. 1B illustrates a schematic view of a conveyance wellbore operating system 130 in which the present disclosure may be implemented. As depicted in FIG. 1B, a hoist 133 may be included as a portion of a platform 131 coupled to a derrick 132, and used with a conveyance 137 to raise or lower equipment such as a wireline tool 134 into or out of a borehole surrounded by a geologic formation 136. The conveyance 137 may provide a communicative coupling between the wireline tool 134 and a control or processing facility 139 at the surface. The conveyance 137 may include wirelines (e.g., one or more wires), slicklines, cables, or the like, as well as tubular conveyances such as coiled tubing, joint tubing, or other tubulars, and may include a downhole tractor. Additionally, power can be supplied via the conveyance 137 to meet power requirements of the tool. The wireline tool 134 may have a local power supply, such as batteries, a downhole generator, and the like. When employing non-conductive cable, coiled tubing, pipe string, or a downhole tractor, communication may be supported using, for example, wireless protocols (e.g. EM, acoustic, etc.), and/or measurements and logging data may be stored in local memory for subsequent retrieval. In at least one embodiment, the wireline tool 134 may be operable to collect samples of the geologic formations throughout the wellbore. For example, core samples may be taken from various formations adjacent the wellbore as the wireline tool 134 moves throughout the length of the wellbore. The control or processing facility 139 may include a computing device 138 capable of carrying out the methods and techniques of the present disclosure, including collecting and analyzing data gathered by the wireline tool 134. In this manner, information about the rock formations adjacent the wellbore may be obtained by the analysis of geologic samples collected by the wireline tool 134 and processed by a computing device, such as computing device 138. In some embodiments, the computing device 138 is equipped to process the received information in substantially real-time, while in some embodiments, the computing device 138 may be equipped to store the received information for processing at some subsequent time. The computing device 138 can be a computing system as described in more detail with respect to FIG. 1C.

FIG. 1C illustrates a system 1 for retrieving core samples from a geologic formation for integrated 2D or 3D image analysis. A wellbore 10 is shown penetrating the geologic formation 12, which may have an upper surface 13. The wellbore 10 can be drilled before formation evaluation tools are lowered into the wellbore 10. The system 1 may include a rig 20 directly on an earth surface 13 and a downhole tool 5 may be conveyed into and out of the wellbore 10 via a conveyance 16. As described above with respect to FIG. 1B, the conveyance may be any suitable means of lowering a tool 5 downhole. A measurement tool 14 and a core sample collection tool 15 may be coupled via a joint 7 and positioned in a vertically stacked formation. The measurement tool 14 may be used to analyze the formation 12 within the wellbore 10, additionally the measurement tool 14 may notate the location within the wellbore where samples are collected via the core sample collection tool 15. Core samples and other formation samples obtained via the core sample collection tool 15 may be received uphole at a location 15A and provided for 2D or 3D image analysis.

In at least one example, the conveyance 16 may include conductors which can provide power and can be used to send control signals and data between the tools and an electronic control system 24. The electronic control system may include a control processor 24A operatively connected with the tool string 5. Logging tool and sample collection operations forming parts of the methods and systems disclosed herein can be embodied in a computer program that runs in the processor 24A. In operation, the program may be coupled to receive data, for example, from the downhole tools, via the conveyance 16, and to transmit control signals to operative elements of the tool string 5. The computer program may be stored on a computer-readable storage medium 24B (e.g. a hard disk) associated with the processor 24A, or may be stored on an external computer-readable storage medium 26 or other recorder and electronically coupled to the processor 24A for use as needed. The storage medium 26 may be any one or more of presently known storage media, such as a magnetic disk fitting into a disk drive, or an optically readable CD-ROM, or a readable device of any other kind, including a remote storage device coupled over a switched telecommunication link, or future storage media suitable for the purposes and objectives described herein. For example, the logging data stored at the storage medium 24B or external storage medium 26 may be transferred to one or more computers 27 having program instructions for carrying out further analysis of the logging data, 2D or 3D image analysis, and/or subsequent integrated formation classification as described herein. The control system 24, the external storage medium 26, and computer 27 may be connected to each other for communications (e.g., data transfer, etc.), via hardwire, radio frequency communications, telecommunications, internet connection, and/or other communication means. Further, the data and other logging related information collected at the control system 24 and/or storage medium 26 may be visually displayed on a monitor, log chart, or other visual means of display 30 at the site and/or offsite. The tool data and any initial interpretation information thereon may be communicated, for example, via satellite or land lines (not shown) to an offsite or remote location for further analysis relevant to logging information or formation characterization, including other interpretation software in combination with 2D or 3D image data obtained from samples collected in the same well interval of the well bore.

Geological formation samples 17, such as core samples or other types of formation samples removed from the formation 12 using core sample retrieval tool 15 can be transported to a CT or scanning electron microscope (SEM) scanner 19. The CT scanner or SEM scanner may use X-rays for analysis of internal structure of the samples, for generation of three dimensional (3D) images 21 of the geologic formation samples retrieved from the formation. The images so generated may be presented in numerical form as one or more data sets. After scanning, the samples may be saved for further analysis or may be discarded. In general, the instrument used to scan the geologic formation samples 17, or other types of retrieved samples from the formation (e.g., core samples, percussion samples, cuttings, etc.), may be selected based on the size of the pores in the rock and what resolution is needed to produce a usable image. In the present example, the 2D or 3D image output (images) 21 generated by the CT scanner 19 may be transferred to a computer 27 having program instructions for carrying out the indicated geologic formation analysis to provide results 29 (e.g., pore/grain classification), described in greater detail below.

Modifications, additions, or omissions may be made to FIGS. 1A-1C without departing from the scope of the present disclosure. For example, FIGS. 1A-1C depict components of the wellbore operating environments in a particular configuration. However, any suitable configuration of components may be used. Furthermore, fewer components or additional components beyond those illustrated may be included in the wellbore operating environment without departing from the scope of the present disclosure. It should be noted that while FIGS. 1A-1C generally depict a land-based operation, those skilled in the art would readily recognize that the principles described herein are equally applicable to operations that employ floating or sea-based platforms and rigs or subsea, without departing from the scope of the present disclosure. Also, even though FIGS. 1A-1C depict a vertical wellbore, the present disclosure is equally well-suited for use in wellbores having other orientations, including horizontal wellbores, slanted wellbores, multilateral wellbores, or the like.

The methods described herein can use machine learning methods in order to provide a more accurate classification of downhole rock formations. For example, the present disclosure relates to a method for removing geologic formation samples from various locations throughout the length of a wellbore. The physical location of each geologic formation sample may be noted and recorded such that the data obtained from an analysis of the sample is correlated to a specific location within the wellbore.

Figure 3:
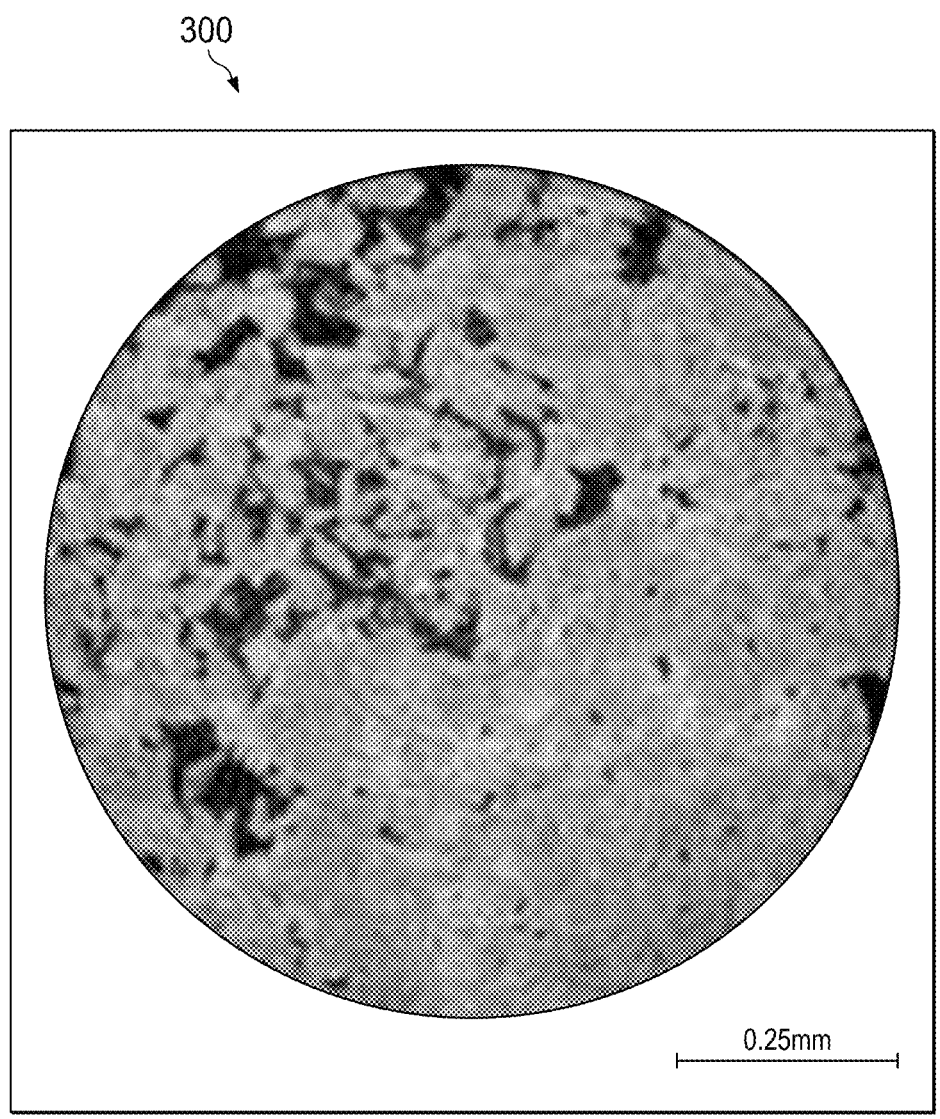
FIG. 3 is a screenshot of an exemplary 2D image of a formation sample, in accordance with one or more aspects of the present disclosure.

The geologic formation sample may then be scanned using an X-ray, a CT scanner, an image sensor, or the like to provide a representative image of the geologic formation sample that can then be further analyzed to determine the appropriate pore and/or grain classifications and associated rock type for that location. FIG. 3 is an illustration of an image 300 of a geologic formation sample taken, for example, by a CT device. In at least one example, the image can be a CT scan of a core sample obtained from a wellbore. In an alternative example, the image can be an image of any geologic sample for which a classification is desired. In at least one example, as the image is created, data relating to the location of the geologic formation within a wellbore or geologic formation is also cataloged. Therefore, after the detailed analysis is performed the classified geologic formation can be traced to a specific location within the geologic formation.

The use of CT herein is only one exemplary imaging technique, as any imaging technique maybe used including any X-ray imaging, magnetic resonance imaging (MRI), scanning electron microscopy (SEM), electrical imaging, resistivity, optical imaging, and acoustical imaging. Imaging as disclosed herein may include a two-dimensional imaging (such as white-lite, UV-light, X-Ray projection, or thin section photography and the like), a three dimensional imaging (such as a CT, SEM, MRI, or any other method or device suitable for evaluating 2-D or 3-D distribution of a property within the sample.

Figure 2:
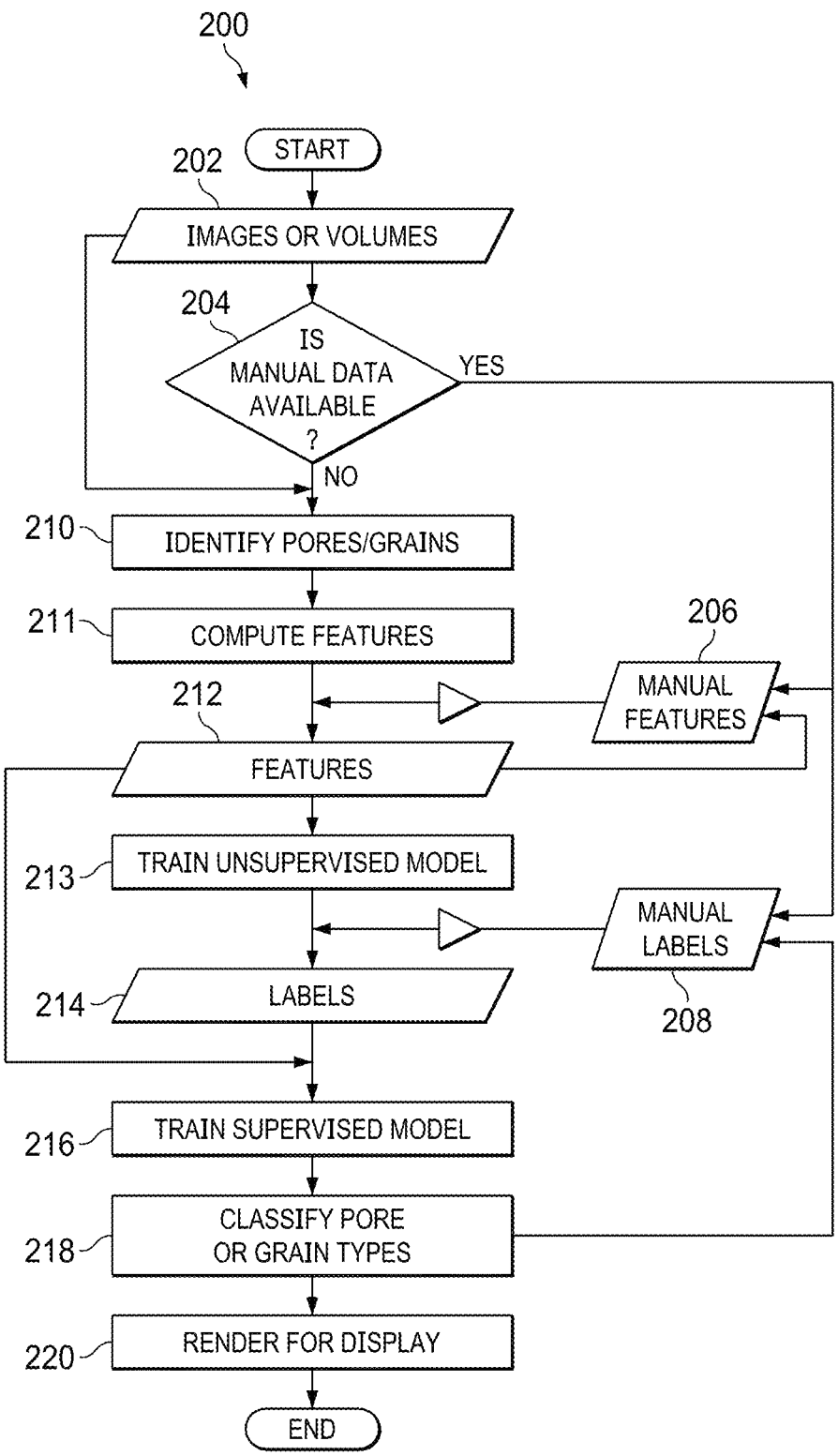
FIG. 2 is a process flow diagram of a method for classifying pore and grain types of a formation sample, in accordance with one or more aspects of the present disclosure.

FIG. 2 is a process flow diagram illustrating a method 200 in accordance with the present disclosure. The method may be performed by the control processor 24A and/or computer (s) 27 of FIG. 1C. The method 200 is for classifying pore bodies or objects (e.g., grains) in a formation sample from a subterranean formation. In embodiments where the method 200 is used to classify pores (as opposed to grains), the classifications for different pore bodies may include, for example, an indication of how much organic matter is deposited in the pores. These pore type classifications may include, for example, primary organic matter, secondary organic matter, or no organic matter.

Figure 4:
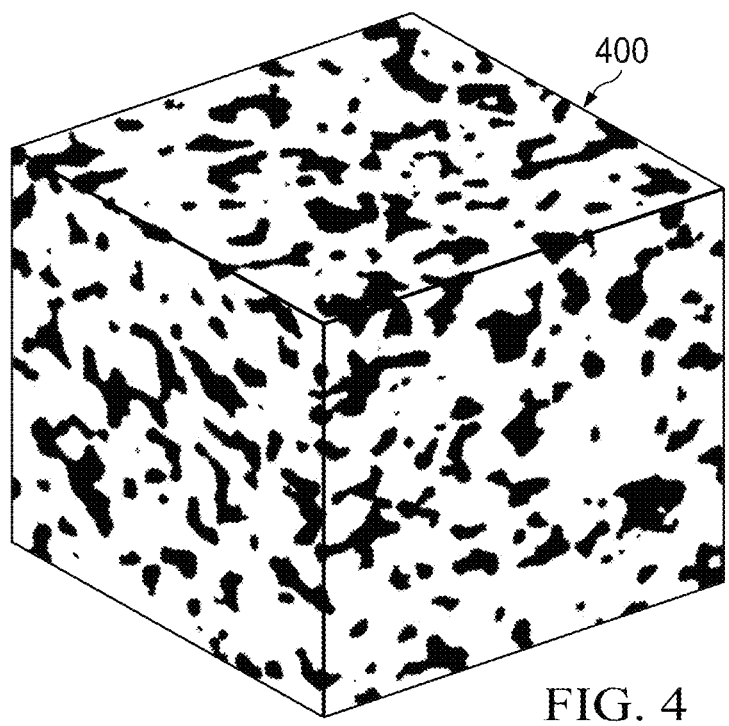
FIG. 4 is a perspective view of an exemplary 3D volume of a formation sample, in accordance with one or more aspects of the present disclosure.

The method 200 begins at block 202 with the acquisition of one or more 2D images or 3D volumes. In particular, the method 200 may include receiving, as a processor, a digital image representation of a formation sample. In some embodiments, the received digital image representation (block 202) may include a 2D image of a slice or thin section of the formation sample. FIG. 3 illustrates an example 2D image 300 of a formation sample in accordance with the present disclosure. In some embodiments, the received digital image representation (block 202) may include a 3D volume representing a volume of the formation sample. FIG. 4 illustrates an example 3D volume 400 of a formation sample in accordance with the present disclosure. A 3D volume 400 image representation of the formation sample may be digitally constructed from a plurality of segmented 2D images taken of different portions of the 3D volume.

The digital image representation (block 202) may be received at the processor from a computer tomographic (CT) scanner (e.g., 19 of FIG. 1C) used to scan the formation sample from the subterranean formation. The digital image representation (block 202) may be received at the processor from a regular or micro-CT scanner, or any other type of scanning equipment (e.g., SEM, X-ray imaging, MRI, electrical imaging, resistivity, optical imaging, and acoustical imaging, and the like) capable of generating one or more images from inside of a rock. The digital image representation (block 202) may be recently acquired from the CT scanner or other imaging device in some embodiments. In other embodiments, the digital image representation (block 202) may have been acquired previously from the CT scanner or other imaging device and stored in a storage device (e.g., storage medium 24B or external storage medium 26 of FIG. 1C) for access and use via the method 200. For example, the digital image representation (block 202) may have been acquired throughout a long period of time, such as years, and stored in a storage device to be used by the method 200.

In the method 200, the digital image representation (block 202) represents the main input to the method 200. That is, the digital image representation (block 202) input to the processor is regarded as the data intended to be used for classification of pore or grain types in the image/volume. Thus, the classification of pore or grain types in the digital image representation is the end step (e.g., block 218) of the method 200 and target goal of the method 200.

In addition to the digital image representation (block 202), the method 200 may also leverage one or more types of manual data, if it is available. The method 200 may include determining whether manual data is available, at block 204. Such manual data may include, for example, manual features (block 206), manual labels (block 208), or a combination thereof. As discussed below, the manual data may function as one or more training sets for the machine learning processes in later steps of the method 200.

The manual features (block 206) may comprise one or more geometric features, such as geometric properties of pores, grains, or both in digital image representations of one or more formation samples, as calculated by a geologist, other skilled person, or a computer. In an example, these calculation(s) may be performed as physical experiments using real rock in a laboratory, using or not using a computer. In another example, the calculation(s) of manual features (block 206) may be performed digitally using a digital image representation of a rock. The manual features (block 206) may have been previously calculated via one or more of the above approaches prior to receiving the digital image representation (block 202) at the processor for performing the present method 200. As such, the manual features (block 206) may be considered "past data" features. The past data features are regarded as the feature data acquired in the past that may or may not be used in the method 200 to classify pore or grain types. The manual features (block 206) may be used only for the sole purpose of training the machine-learning models.

The manual labels (block 208) may comprises one or more labels, such as pore types, sub-types or super-types, grain types, sub-types or super-types, or a combination thereof, as labeled by a geologist, other skilled person, or a computer. In an example, these labels may be applied to a real rock, not using a computer. In another example, the labels may be applied using a computer to a digital image representation of a rock. The manual labels (block 208) that may be input to the method 200 may include, for example, one or more labeled SEM 2D images. The manual labels (block 208) may have been previously applied to real or digital rock sample(s) via one or more of the above approaches prior to receiving the digital image representation (block 202) at the processor for performing the present method 200. As such, the manual labels (block 208) may be considered "past data" labels. The past data labels are regarded as the labels acquired in the past that may or may not be used in the method 200 to classify pore or grain types. The manual labels (block 208) may be used only for the sole purpose of training a machine-learning model.

Regardless of whether any manual data is available (block 204), the method 200 next proceeds to block 210. At block 210, the method 200 may include identifying a plurality of pores, grains, or both in the digital image representation of the formation sample. The plurality of pores, grains, or both may be those pores, grains, or both which are visible in the 2D image or 3D volume. The digital image representation may take the form of at least one data set. As such, block 202 may include receiving at least one data set providing the digital image representation. In some embodiments, identifying the plurality of pores, grains, or both (block 210) in the digital image representation may include analyzing the at least one data set via the processor to identify the plurality of pores, grains, or both in the digital image representation. This analysis may include any desired image processing techniques such as filtering the data set to identify groups of pixels in the image that represent pores and/or grains or pore/grain boundaries.

In other embodiments, identifying the plurality of pores, grains, or both (block 210) in the digital image representation may include receiving, via the processor, a user selection of the plurality of pores, grains, or both in the digital image representation. For example, the processor may display a 2D image or 3D volume on a display (e.g., display 30 of FIG. 1C) and then receive the user selection of the plurality of pores, grains, or both via an input device such as a mouse, keyboard, or the display itself (e.g., a touchscreen). Other techniques may be used to provide a user selection of the pores, grains, or both to the processor. In still other embodiments, a combination of automated image data set analysis and user selection techniques may be used to identify the plurality of pores, grains, or both (block 210) in the digital image representation.

The method 200 may next include computing (block 211), via the processor, a plurality of geometric features associated with the plurality of pores, grains, or both in the digital image representation of the formation sample. From the CT or other imaging data (block 202), the processor computes (block 211) features (e.g., rock properties) that may consist of geometric image-based or volume-based properties. These geometric features may be computed (block 211) using well-established calculations in the field of geology.

Figure 5:
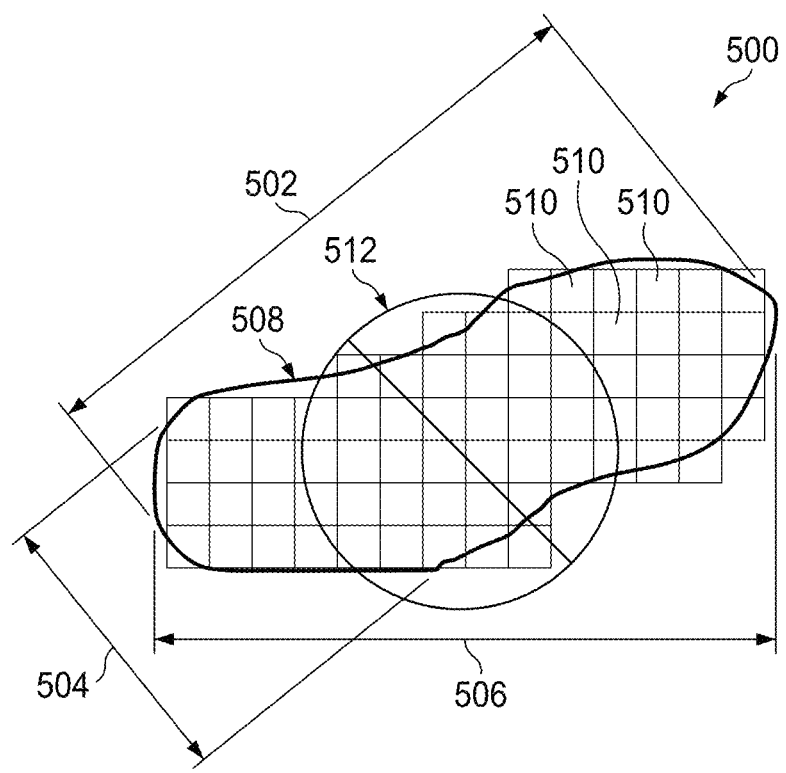
FIG. 5 is a schematic diagram of an exemplary pore or grain visible in an image of a formation sample and showing various geometric features associated with the pore or grain, in accordance with one or more aspects of the present disclosure.

FIG. 5 illustrates an example pore 500 identified in a digital image representation, along with examples of several geometric features that may be computed at block 211 of the method 200. These geometric features may include, for example, a length 502 of the pore 500, a width 504 of the pore 500, and the Feret's diameter 506 of the pore 500. The Feret's diameter 506 is a longest dimension in the pore/grain size. The pore 500 in FIG. 5 is represented by its boundary 508, a thick black line, where a number of pixels 510 (in the case of a 2D thin section image) or voxels (in the case of a 3D volume) are inside the boundary 508 and constitute one image-based property or volume-based property. Several other geometric features exist and may also be computed (step 211 of FIG. 2). For example, the pore size distribution (or grain size distribution) may be computed. In an example, pore size distribution may refer to frequency and cumulative distributions of pore sizes computed as a ratio of the volume to surface of individual segmented pores in the 3D volume. In another example, pore size distribution may include a hydraulic pore size distribution based on an openness of the pore space. Hydraulic pore size distribution may be based on an opening map of the pore space in which every pore voxel has a value equal to the radius of the largest sphere that can be inscribed in the pore space without intersecting a solid voxel. Grain size distribution refers to the relative amounts of grains of certain sizes present within the 3D volume, which may be determined using similar measurements for solid regions in the 3D volume as opposed to openings The mean, standard deviation, median, and mode of the pore (or grain) size distribution may then be used to derive the skewness and kurtosis of the pores (or grains). Other separate calculations may be used to compute sphericity, flatness, roundness, and/or imbrication of the pores (or grains).

As such, the plurality of geometric features may include, for example, one or more features such as length, width, area, area fraction (i.e., fraction between the area of the pore/grain and the area of the image), Feret's diameter, Feret's shape, a number of pixels or voxels inside the identified pore or grain, sum of the voxel surfaces on the outside of each connected component, a number of pixels or voxels in the pore/grain located along a boundary of the image, a shortest edge to edge distance from the pore or grain to its nearest neighbor, a number of holes therein, circle differential area (i.e., difference between the area of the pore or grain and an area of a smoothing circle or an enclosing circle thereof), location of the center of gravity, moment of inertia, equivalent circular diameter, equivalent spherical diameter, pore or grain size distribution, skewness, kurtosis, sphericity, flatness, roundness, imbrication, curvature, anisotropy, uniformity, homogeneity, Crofton perimeter, elongation, eccentricity, variance, inside length, orientation, perimeter, rugosity, Shape factor, symmetry, volume, breadth, and connectedness.

These geometric features are merely examples of many properties that may be computed on the pores (or grains), and they correspond to pore (or grain) characterization and morphology. In addition, for certain rocks, the pores may be replaced by grains and the same characterization and morphology apply, such that the pores or grains in the context of the present disclosure are interchangeable. In some embodiments, for reference a standard scale unit 512, such as 1 Phi, may be used instead of pixels 510 or voxels to compute the various geometric features.

Turning back to FIG. 2, at block 213 the method 200 includes inputting the plurality of geometric features computed at block 211 into an unsupervised machine learning model. In embodiments where manual data indicating geometric features (block 206) is available, the method 200 includes receiving, at the processor, the manual data indicating the geometric features (block 206), and inputting at block 213 the manual data indicating geometric features (block 206) into the unsupervised machine learning model along with the plurality of geometric features (block 211) computed by the processor. For example, after the geometric features for the digital image representation (block 202) are computed at block 211, the geometric features may be merged with the pre-existing manual features (block 206) to form a database of features (block 212) of pores or grains to be used by the unsupervised machine learning model. In embodiments where no manual geometric features are available, the geometric features computed at block 211 are provided alone in a database of features (block 212) of the pores and/or grains identified in the digital image representation.

Prior to inputting the geometric features into the unsupervised model (block 213), the processor may further prepare or condition the database of geometric features (block 212). For example, the method 200 may include preparing the at least one data set by filtering out pore or grain samples having less than a certain number of pixels (e.g., <20 pixels in area) or voxels, checking for empty cells in the feature database, discarding repetitive portions (e.g., repeated columns) of the feature database, discarding highly correlated columns in the feature database, converting the database into a group of arrays for entry into the unsupervised machine learning model (block 213), and/or storing all column names of the feature database as feature names. The resulting geometric features may be input to the unsupervised machine learning model as a group of arrays, where each array is a list of geometric features associated with a different pore and/grain in the digital image representation.

In accordance with the present disclosure, the first machine learning model that may be trained by the method 200 is an unsupervised model (block 213). The unsupervised machine learning model (block 213) uses only the geometric features (block 212) as input. At block 214, the method 200 includes determining, using the unsupervised machine learning model, a label for each identified pore and each identified grain from the digital image representation (block 202). The labels at block 214 may represent a pore-type for each pore and a grain-type for each grain identified at block 210. Determining the labels (block 214) may include clustering each of the identified pores and/or grains in a feature space via the unsupervised machine learning model. The feature space is a multi-dimensional space where each dimension corresponds to one of the plurality of features in the feature database of block 212. The unsupervised machine learning model may cluster the data representing different pores and/or grains within the multi-dimensional feature space and, in some embodiments, reduce the dimensionality of the data set (e.g., number of parameters that may be used to plot the data set). Block 214 of the method 200 may further include assigning labels to the pores and/or grains clustered in one or more regions within the feature space (or reduced parameter space), where each label corresponds to a separate region within the feature space. The unsupervised machine learning model may generate its own labels (block 214), each label representing a separated region within the feature space (or reduced parameter space) learned by the model. As discussed above, the unsupervised machine learning model may be used with pre-existing past feature data or with just the features computed at block 211.

The unsupervised machine learning model used to generate the labels (block 214) may be any desired type of unsupervised machine learning model used for clustering data including, but not limited to, a Gaussian Mixture Model (GMM), a symbolic regression, xGBoost, and the like. The unsupervised machine learning model may be trained using the past data (e.g., features 206) as training data. The unsupervised machine learning model may output unique labels learned for the different pores and/or grains included in the input feature database 212. In some embodiments, the unsupervised machine learning model may also output an indication of the accuracy of the model, one or more clustering model properties, and other information.

At block 216, the method 200 includes inputting the plurality of geometric features (block 212) and the labels (block 214) for each of the identified pores, grains, or both, into a supervised machine learning model. In embodiments where manual data indicating labels (block 208) is available, the method 200 includes receiving, at the processor, the manual data indicating the labels (block 208), and inputting at block 216 the manual data indicating labels (block 208) into the supervised machine learning model along with the plurality of geometric features (block 212) and labels (block 214) determined by the unsupervised model. For example, after the initial labels for the digital image representation (block 202) are determined by the unsupervised model at block 214, the labels (block 214) may be merged with the pre-existing manual labels (block 208) to form a database of labels of pores or grains to be used by the second machine learning model. In some embodiments, merging the manual data indicating labels (block 208) with the labels determined at block 214 may be performed based on input from a user. That is, the merge may be done manually by a geologist or other skilled user, for example. In other embodiments, merging the manual data indicating labels (block 208) with the labels determined at block 214 may be performed automatically via the processor using a best fit correlation analysis. For example, the processor may use the best fit between label sets (208 and 214) using mutual information correlation between the label sets. In embodiments where no manual labels are available, the labels determined at block 214 are provided in a database of labels of the pores and/or grains identified in the digital image representation.

In accordance with the present disclosure, the second machine learning model that may be trained by the method 200 is a supervised model (block 216). The supervised machine learning model (block 216) uses both the geometric features (block 212) and the database of labels (208 and/or 214) as input. This is the final machine learning model in the method 200 to classify pore or grain types.

At block 218, the method 200 includes determining, using the supervised machine learning model, a final classification of a pore-type for each identified pore and a grain-type for each identified grain in the digital image representation (block 202) of the formation sample. The final classification at block 218 is a pore-type for each pore and a grain-type for each grain identified at block 210. Determining the final classification (block 218) may include, for example, using a target vector comprising the labels 214 provided by the unsupervised clustering machine learning model, and standardizing (e.g., z-scoring) the input features (block 212) to be in the classification model. The labels 214 are then correlated with the training set of labels 208 based on their associated geometric features 212. The supervised machine learning model may output the final classification (block 218) of pore-types and/or grain-types, which provide meaningful geologic information. The final classification of pore-types may include one or more pore-types selected from the following: intercrystalline, interparticle, intraparticle, fenestral, shelter, growth framework, moldic, fracture, channel, vug, cavern, micro porosity, meso porosity, macro porosity, porosity associated with organic matter, clay bound pores, effective porosity, mobilized secondary organic matter pore. The final classification of grains in clastic reservoirs includes at least one of grain size, grain sorting, grain size skewness and kurtosis, grain angularity, grain sphericity/elongation and fabric to evaluate reservoir quality. The final classification of grains may include one or more features selected from the following: grain size as defined by the modified Udden-Wentworth grain size chart (e.g., gravel, sand, silt, clay), grain sorting by (phi) units as defined by Folk and Ward (1957) (e.g., very well sorted, well sorted, moderately sorted, poorly sorted, and very poorly sorted), grain angularity (e.g., angular, subangular, subrounded to rounded), and fabric as defined by either Dunham (1962) (e.g., mudstone, wackestone, packstone, grainstone, boundstone, crystalline carbonate), Embry and Klovan (1971) (e.g., floatstone, rudstone, bafflestone, bindstone, framestone), or Folk (1959) (e.g., micrite, fossiliferous biomicrite, sparse biomicrite, packed biomicrite, poorly washed iosparite, unsorted biosparite, sorted biosparite, rounded bisparite). For the pores the classification by Choquette and Pray (1970) and later authors describe a variety of pore types: intercrystalline, interparticle, intraparticle, fenestral, shelter, growth framework, moldic, fracture, channel, vug, cavern, micro porosity, meso porosity, macro porosity, porosity associated with organic matter, clay bound pores, effective porosity, and mobilized secondary organic matter pore, etc.

In some embodiments, the computed geometric features (block 212) and determined final classifications (block 218) of pore-types/grain-types may be fed back into the method 200 as manual features (block 206) and manual labels (block 208), respectively, for classification of a new formation sample. In some embodiments, the method 200 may be repeated in this manner for several iterations to classify the pore-types/grain-types of multiple formation samples from the same formation, each time with a larger manual set of geometric features (206) and labels (208) to train the machine learning models. The method 200, with the reduction in dimensionality of the unsupervised machine learning model and the regression analysis of the supervised machine learning model, may be iterated until the supervised machine learning model outputs classification results with a high enough R squared to effectively characterize the subterranean formation.

The disclosed method 200 provides classification of pore or grain types with higher accuracy and far greater speed than would be possible by a geologist examining and manually labelling rock samples. Even though the labelling of pore/grain types in rock samples follows long established classification schemes, it can be difficult to detect patterns in the geometry of the formation samples. In addition, since the manual classification of pore/grain types is ultimately a subjective process, different geologists may assign different classifications to the same formation samples. The present disclosure uses machine learning techniques to take the guesswork out of the process of classifying pore-types or grain-types in a formation sample. The disclosed systems and methods enable the easy, fast, and accurate classification of pore types (e.g., intercrystalline) that are known to be desirable for oil and gas production, so that decisions can be made regarding where to proceed with drilling and completion of wells. Since the process is automated and may be performed via a non-transitory computer-readable medium, formations can be classified and decisions regarding where to drill or complete wells can be made in days, as opposed to months or years as is typical with existing manual techniques. In addition, the automated systems and methods may provide this classification data for a subterranean formation in a large and quantifiably related fashion, without inconsistencies between multiple geologists.

Figure 6:
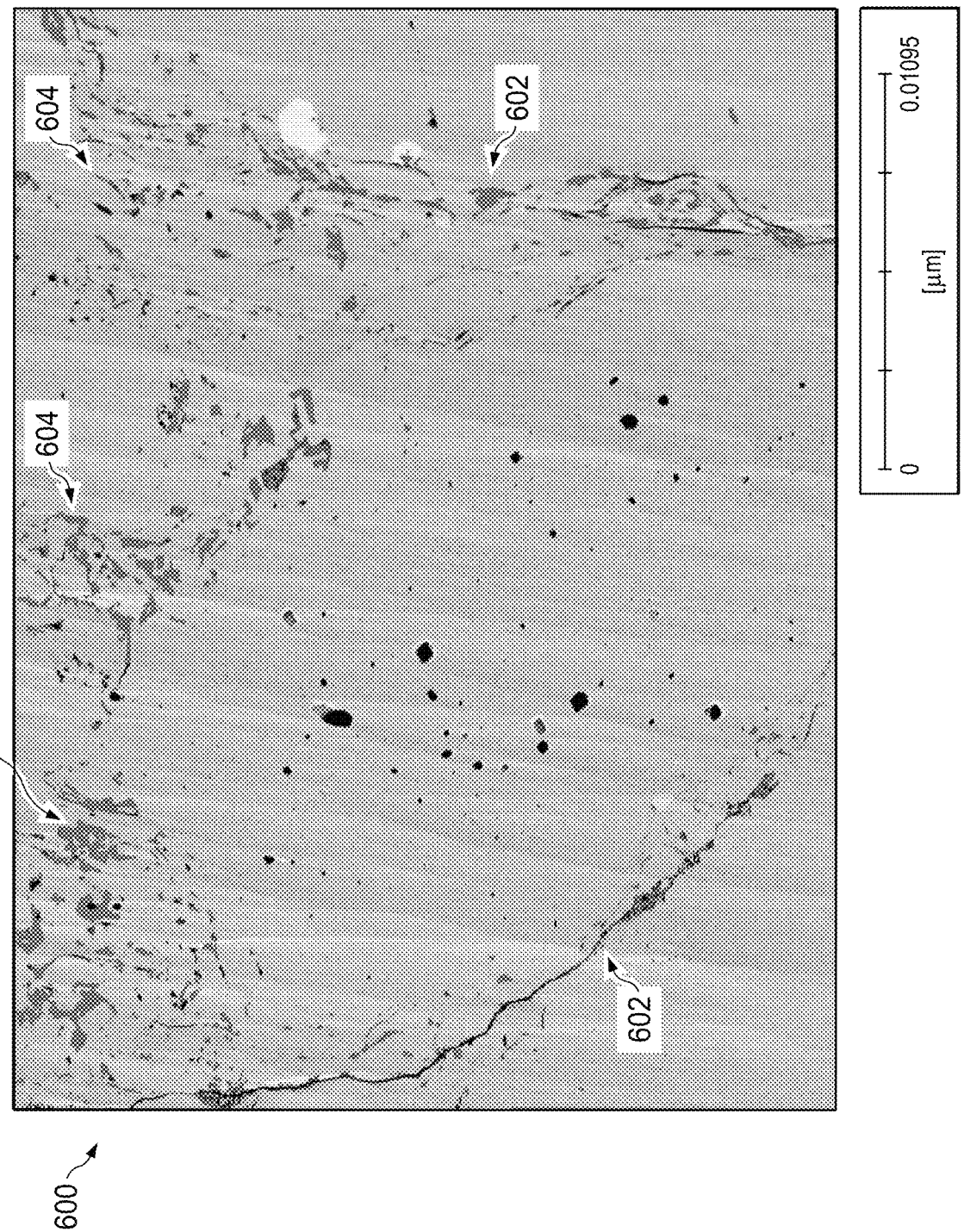
FIG. 6 is a screenshot of an exemplary 2D image of a formation sample overlaid with labels for different pore types or grain types, in accordance with one or more aspects of the present disclosure.

In some embodiments, at block 220, the method 200 may include rendering for display, on a display, the digital image representation of the formation sample superimposed with one or more visual labels corresponding to the final classification of the pore-type for each pore and grain-type for each grain. An example of one such display is provide in FIG. 6. As illustrated, the digital image 600 includes two different visual labels 602 and 604 (illustrated as different textures) located at different pore locations throughout the digital image 600. In the illustrated embodiment, the label 602 represents primary organic matter, while the label 604 represents secondary (mobile) organic matter.

The disclosed systems and methods use apparently unrelated techniques and data to provide pore-type and grain-type classifications automatically. Namely, the disclosed method involves the computation of various properties (features) related to pore (or grain) shape geometry, leveraging existing data with manual labels of pore types and the calculation of additional features, and training machine-learning models using all available features and labels in unsupervised and supervised manners. The disclosed systems and methods may increase the quality of services delivered via digital rock analysis software used to analyze rock images as 2D thin sections or 3D volumes generated by imaging core, plug, or subsamples of a formation.

One or more aspects of the present disclosure provide a method. The method includes receiving, at a processor, a digital image representation of a formation sample. The method further includes identifying a plurality of pores, grains, or both in the digital image representation of the formation sample. The method further includes computing, via the processor, a plurality of geometric features associated with the plurality of pores, grains, or both in the digital image representation of the formation sample. The method further includes inputting the plurality of geometric features into an unsupervised machine learning model. The method further includes determining, using the unsupervised machine learning model, a label for each identified pore and each identified grain, wherein the label comprises a pore-type for the pore or a grain-type for the grain. The method further includes inputting the plurality of geometric features and the labels determined for each of the identified pores, grains, or both, into a supervised machine learning model. The method further includes determining, using the supervised machine learning model, a final classification of a pore-type for each pore and a grain-type for each grain identified in the digital image representation of the formation sample.

In one or more aspects, the method further includes: receiving, at the processor, manual data indicating geometric features associated with pores, grains, or both in digital image representations of one or more other formation samples, the manual data having been previously determined by a geologist, and inputting the manual data indicating geometric features into the unsupervised machine learning model along with the plurality of geometric features computed by the processor.

In one or more aspects, the method further includes: receiving, at the processor, manual data indicating labels for pores, grains, or both in digital image representations of one or more other formation samples, the manual data having been previously determined by a geologist, and inputting the manual data indicating labels into the supervised machine learning model along with the plurality of geometric features and the labels determined for each of the identified pores, grains, or both.

In one or more aspects, the method further includes: clustering each of the identified pores and/or grains in a feature space via the unsupervised machine learning model, the feature space being a multi-dimensional space where each dimension corresponds to one of the plurality of features, and assigning labels to the pores and/or grains clustered in one or more regions within the feature space, wherein each label corresponds to a separate region within the feature space.

In one or more aspects, the method further includes: receiving the digital image representation of the formation sample comprises receiving at least one data set, and identifying the plurality of pores, grains, or both comprises analyzing the data set via the processor to identify the plurality of pores, grains, or both in the digital image representation.

In one or more aspects, identifying the plurality of pores, grains, or both includes receiving, via the processor, a user selection of the plurality of pores, grains, or both in the digital image representation.

In one or more aspects, the plurality of geometric features include one or more features selected from the list consisting of: wherein the plurality of geometric features comprise one or more features selected from the list consisting of: length, width, area, area fraction, Feret's diameter, Feret's shape, number of pixels or voxels inside the identified pore or grain, sum of the voxel surfaces on the outside of each connected component, number of pixels or voxels in the pore/grain located along a boundary of the image, shortest edge to edge distance from the pore or grain to its nearest neighbor, number of holes therein, circle differential area, location of center of gravity, moment of inertia, equivalent circular diameter, equivalent spherical diameter, pore or grain size distribution, skewness, kurtosis, sphericity, flatness, roundness, imbrication, curvature, anisotropy, uniformity, homogeneity, Crofton perimeter, elongation, eccentricity, variance, inside length, orientation, perimeter, rugosity, Shape factor, symmetry, volume, breadth, and connectedness.

In one or more aspects, the label for each identified pore comprises a pore-type selected from the group consisting of: intercrystalline, interparticle, intraparticle, fenestral, shelter, growth framework, moldic, fracture, channel, vug, cavern, micro porosity, meso porosity, macro porosity, porosity associated with organic matter, clay bound pores, effective porosity, and mobilized secondary organic matter pore.

In one or more aspects, the label for each identified grain comprises at least one of a grain size, a grain sorting by phi units, grain angularity, and fabric.

In one or more aspects, the digital image representation includes a 2D image of a slice of the formation sample.

In one or more aspects, the digital image representation includes a 3D volume representing a volume of the formation sample.

In one or more aspects, the method further includes rendering for display, on a display, the digital image representation of the formation sample superimposed with one or more visual labels corresponding to the final classification of the pore-type for each pore and grain-type for each grain.

In one or more aspects, receiving the digital image representation includes receiving the digital image representation of the formation sample from a computer tomographic (CT) scanner used to scan the formation sample from the subterranean formation.

In one or more aspects, the method further includes merging the manual data indicating labels with the labels determined for each of the identified pores, grains, or both based on input from a user.

In one or more aspects, the method further includes merging the manual data indicating labels with the labels determined for each of the identified pores, grains, or both via the processor using a best fit correlation analysis.

In one or more aspects, receiving the digital image representation includes receiving the digital image representation of the formation sample from a storage medium storing past scans of one or more formation samples.

One or more aspects of the present disclosure also provide a system for classifying pores, grains, or both in a formation sample. The system includes a non-transitory storage medium and at least one processor coupled to the non-transitory storage medium. The at least one processor executes one or more instructions stored on the non-transitory storage medium to: receive a digital image representation of a formation sample; identify a plurality of pores, grains, or both in the digital image representation of the formation sample; compute a plurality of geometric features associated with the plurality of pores, grains, or both in the digital image representation of the formation sample; input the plurality of geometric features into an unsupervised machine learning model; determine, using the unsupervised machine learning model, a label for each identified pore and each identified grain, wherein the label comprises a pore-type for the pore or a grain-type for the grain; input the plurality of geometric features and the labels determined for each of the identified pores, grains, or both, into a supervised machine learning model; and determine, using the supervised machine learning model, a final classification of a pore-type for each pore and a grain-type for each grain identified in the digital image representation of the formation sample.

In one or more aspects, the system further includes a computer tomographic (CT) scanner communicatively coupled to the at least one processor, wherein the at least one processor receives the digital image representation of a formation sample from the CT scanner.

In one or more aspects, the system further includes a display communicatively coupled to the at least one processor, wherein the at least one processor executes one or more instructions stored on the non-transitory storage medium to: render, for display on the display, the digital image representation of the formation sample superimposed with one or more visual labels corresponding to the final classification of the pore-type for each pore and grain-type for each grain.

One or more aspects of the present disclosure also provide a non-transitory computer-readable medium storing one or more instructions that, when executed by at least one processor, cause the at least one processor to perform one or more operations. The one or more operations includes: receiving a digital image representation of a formation sample; identifying a plurality of pores, grains, or both in the digital image representation of the formation sample; computing a plurality of geometric features associated with the plurality of pores, grains, or both in the digital image representation of the formation sample; inputting the plurality of geometric features into an unsupervised machine learning model; determining, using the unsupervised machine learning model, a label for each identified pore and each identified grain, wherein the label comprises a pore-type for the pore or a grain-type for the grain; inputting the plurality of geometric features and the labels determined for each of the identified pores, grains, or both, into a supervised machine learning model; and determining, using the supervised machine learning model, a final classification of a pore-type for each pore and a grain-type for each grain identified in the digital image representation of the formation sample.

In one or more aspects, the one or more operations further include: receiving manual data indicating geometric features associated with pores, grains, or both in digital image representations of one or more other formation samples, the manual data having been previously determined by a geologist; and inputting the manual data indicating geometric features into the unsupervised machine learning model along with the plurality of computed geometric features In one or more aspects, the one or more operations further include: receiving manual data indicating labels for pores, grains, or both in digital image representations of one or more other formation samples, the manual data having been previously determined by a geologist; and inputting the manual data indicating labels into the supervised machine learning model along with the plurality of geometric features and the labels determined for each of the identified pores, grains, or both.

Therefore, the present disclosure is well adapted to attain the ends and advantages mentioned as well as those that are inherent therein. The particular aspects disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative aspects disclosed above may be altered or modified and all such variations are considered within the scope and spirit of the present disclosure. Also, the terms in the claims have their plain, ordinary meaning unless otherwise explicitly and clearly defined by the patentee. The indefinite articles "a" or "an," as used in the claims, are defined herein to mean one or more than one of the elements that it introduces.

What is claimed is:

1. A method, comprising:
   receiving, at a processor, a digital image representation of a formation sample, wherein the digital image is obtained at least in part from a computer-tomographic (CT) scanner;
   identifying a plurality of pores, grains, or both in the digital image representation of the formation sample;
   computing, via the processor, a plurality of geometric features associated with the plurality of pores, grains, or both in the digital image representation of the formation sample;
   inputting the plurality of geometric features into an unsupervised machine learning model;
   determining, using the unsupervised machine learning model, a label for each identified pore and each identified grain, wherein the label comprises a pore-type for the pore or a grain-type for the grain;
   inputting the plurality of geometric features and the labels determined for each of the identified pores, grains, or both, into a supervised machine learning model;
   determining, using the supervised machine learning model, a final classification of a pore-type for each pore and a grain-type for each grain identified in the digital image representation of the formation sample and
   based on the determination of a final classification of pore-type for each pore and a grain-type for each grain identified in the digital image representation of the formation sample, performing hydrocarbon production operations in a selected location in the formation.

2. The method of claim 1, further comprising:
   receiving, at the processor, manual data indicating geometric features associated with pores, grains, or both in digital image representations of one or more other formation samples, the manual data having been previously determined by a geologist; and
   inputting the manual data indicating geometric features into the unsupervised machine learning model along with the plurality of geometric features computed by the processor.

3. The method of claim 1, further comprising:
   receiving, at the processor, manual data indicating labels for pores, grains, or both in digital image representations of one or more other formation samples, the manual data having been previously determined by a geologist; and
   inputting the manual data indicating labels into the supervised machine learning model along with the plurality of geometric features and the labels determined for each of the identified pores, grains, or both.

4. The method of claim 1, further comprising:
   clustering each of the identified pores and/or grains in a feature space via the unsupervised machine learning model, the feature space being a multi-dimensional space where each dimension corresponds to one of the plurality of features; and
   assigning labels to the pores and/or grains clustered in one or more regions within the feature space, wherein each label corresponds to a separate region within the feature space.

5. The method of claim 1, wherein:
   receiving the digital image representation of the formation sample comprises receiving at least one data set; and
   identifying the plurality of pores, grains, or both comprises analyzing the data set via the processor to identify the plurality of pores, grains, or both in the digital image representation.

6. The method of claim 1, wherein identifying the plurality of pores, grains, or both comprises receiving, via the processor, a user selection of the plurality of pores, grains, or both in the digital image representation.

7. The method of claim 1, wherein the plurality of geometric features comprise one or more features selected from the list consisting of: length, width, area, area fraction, Feret's diameter, Feret's shape, number of pixels or voxels inside the identified pore or grain, sum of the voxel surfaces on the outside of each connected component, number of pixels or voxels in the pore/grain located along a boundary of the image, shortest edge to edge distance from the pore or grain to its nearest neighbor, number of holes therein, circle differential area, location of center of gravity, moment of inertia, equivalent circular diameter, equivalent spherical diameter, pore or grain size distribution, skewness, kurtosis, sphericity, flatness, roundness, imbrication, curvature, anisotropy, uniformity, homogeneity, Crofton perimeter, elongation, eccentricity, variance, inside length, orientation, perimeter, rugosity, Shape factor, symmetry, volume, breadth, and connectedness.

8. The method of claim 1, wherein the label for each identified pore comprises a pore-type selected from the group consisting of: intercrystalline, interparticle, intraparticle, fenestral, shelter, growth framework, moldic, fracture, channel, vug, cavern, micro porosity, meso porosity, macro porosity, porosity associated with organic matter, clay bound pores, effective porosity, and mobilized secondary organic matter pore.

9. The method of claim 1, wherein the label for each identified grain comprises at least one of a grain size, a grain sorting by phi units, skewness, kurtosis, grain angularity, grain sphericity and fabric.

10. The method of claim 1, wherein the digital image representation comprises a 2D image of a slice of the formation sample.

11. The method of claim 1, wherein the digital image representation comprises a 3D volume representing a volume of the formation sample.

12. The method of claim 1, further comprising rendering for display, on a display, the digital image representation of the formation sample superimposed with one or more visual labels corresponding to the final classification of the pore-type for each pore and grain-type for each grain.

13. The method of claim 1, wherein receiving the digital image representation comprises receiving the digital image representation of the formation sample from a computer tomographic (CT) scanner used to scan the formation sample from the subterranean formation.

14. The method of claim 1, wherein receiving the digital image representation comprises receiving the digital image representation of the formation sample from a storage medium storing past scans of one or more formation samples.

15. A system for classifying pores, grains, or both in a formation sample, the system comprising:
a non-transitory storage medium; and
at least one processor coupled to the non-transitory storage medium, wherein the at least one processor executes one or more instructions stored on the non-transitory storage medium to:
receive a digital image representation of a formation sample, wherein the digital image is obtained at least in part from a computer-tomographic (CT) scanner;
identify a plurality of pores, grains, or both in the digital image representation of the formation sample;
compute a plurality of geometric features associated with the plurality of pores, grains, or both in the digital image representation of the formation sample;
input the plurality of geometric features into an unsupervised machine learning model;
determine, using the unsupervised machine learning model, a label for each identified pore and each identified grain, wherein the label comprises a pore-type for the pore or a grain-type for the grain;
input the plurality of geometric features and the labels determined for each of the identified pores, grains, or both, into a supervised machine learning model;
determine, using the supervised machine learning model, a final classification of a pore-type for each pore and a grain-type for each grain identified in the digital image representation of the formation sample and
based on the determination of a final classification of pore-type for each pore and a grain-type for each grain identified in the digital image representation of the formation sample, performing hydrocarbon production operations in a selected location in the formation.

16. The system of claim 15, further comprising a computer tomographic (CT) scanner communicatively coupled to the at least one processor, wherein the at least one processor receives the digital image representation of a formation sample from the CT scanner.

17. The system of claim 15, further comprising a display communicatively coupled to the at least one processor, wherein the at least one processor executes one or more instructions stored on the non-transitory storage medium to:
render, for display on the display, the digital image representation of the formation sample superimposed with one or more visual labels corresponding to the final classification of the pore-type for each pore and grain-type for each grain.

18. A non-transitory computer-readable medium storing one or more instructions that, when executed by at least one processor, cause the at least one processor to perform one or more operations comprising:
receiving a digital image representation of a formation sample, wherein the digital image is obtained at least in part from a computer-tomographic (CT) scanner;
identifying a plurality of pores, grains, or both in the digital image representation of the formation sample;
computing a plurality of geometric features associated with the plurality of pores, grains, or both in the digital image representation of the formation sample;
inputting the plurality of geometric features into an unsupervised machine learning model;
determining, using the unsupervised machine learning model, a label for each identified pore and each identified grain, wherein the label comprises a pore-type for the pore or a grain-type for the grain;
inputting the plurality of geometric features and the labels determined for each of the identified pores, grains, or both, into a supervised machine learning model;
determining, using the supervised machine learning model, a final classification of a pore-type for each pore and a grain-type for each grain identified in the digital image representation of the formation sample; and
based on the determination of a final classification of pore-type for each pore and a grain-type for each grain identified in the digital image representation of the formation sample, performing hydrocarbon production operations in a selected location in the formation.

19. The non-transitory computer-readable medium of claim 18, wherein the one or more operations further comprise:
receiving manual data indicating geometric features associated with pores, grains, or both in digital image representations of one or more other formation samples, the manual data having been previously determined by a geologist; and inputting the manual data indicating geometric features into the unsupervised machine learning model along with the plurality of computed geometric features.

20. The non-transitory computer-readable medium of claim 18, wherein the one or more operations further comprise:

receiving manual data indicating labels for pores, grains, or both in digital image representations of one or more other formation samples, the manual data having been previously determined by a geologist; and inputting the manual data indicating labels into the supervised machine learning model along with the plurality of geometric features and the labels determined for each of the identified pores, grains, or both.

* * * * *